US010634583B2

(12) United States Patent
Waag et al.

(10) Patent No.: US 10,634,583 B2
(45) Date of Patent: Apr. 28, 2020

(54) CONDITION MONITORING METHOD

(71) Applicant: MHWIRTH AS, Kristiansand S (NO)

(72) Inventors: Tor Inge Waag, Kristiansand S (NO);
Eivind Mogensen, Kristiansand S (NO)

(73) Assignee: MHWIRTH AS, Kristiansand S (NO)

( * ) Notice: Subject to any disclaimer, the term of this patent is extended or adjusted under 35 U.S.C. 154(b) by 226 days.

(21) Appl. No.: 15/742,527

(22) PCT Filed: Jun. 27, 2016

(86) PCT No.: PCT/NO2016/050142
§ 371 (c)(1),
(2) Date: Jan. 8, 2018

(87) PCT Pub. No.: WO2017/007333
PCT Pub. Date: Jan. 12, 2017

(65) Prior Publication Data
US 2018/0202897 A1  Jul. 19, 2018

(30) Foreign Application Priority Data
Jul. 9, 2015  (NO) ................................. 20150899

(51) Int. Cl.
*G01M 13/02* (2019.01)
*G01M 13/021* (2019.01)
(Continued)

(52) U.S. Cl.
CPC .......... *G01M 13/021* (2013.01); *F16H 57/01* (2013.01); *F16H 57/0405* (2013.01);
(Continued)

(58) Field of Classification Search
CPC . F16H 2057/012; F16N 29/00; G01M 13/021
See application file for complete search history.

(56) References Cited

U.S. PATENT DOCUMENTS 4,620,185 A  10/1986  Plahmer
5,754,055 A   5/1998  McAdoo et al.
(Continued)

FOREIGN PATENT DOCUMENTS

EP  0 197 878     * 10/1986
EP  0 197 878 A2  10/1986

*Primary Examiner* — John Fitzgerald
(74) *Attorney, Agent, or Firm* — Norman B. Thot

(57) ABSTRACT

A method for monitoring a condition of a mechanical system having an oil lubricated component. The method includes: (a) identifying a start of a load cycle, (b) measuring a load of the oil lubricated component, (c) measuring a temperature of a lubricating oil for the oil lubricated component, (d) calculating a first system performance parameter value for a load cycle, (e) repeating steps (a) to (d) for a plurality of load cycles, and (f) comparing a plurality of first system performance parameter values calculated to identify a change in the first system performance parameter values over the plurality of load cycles. The first system performance parameter value for the load cycle is selected from a friction coefficient for the oil lubricated component, a temperature increase coefficient for the lubricating oil for the oil lubricated component, and a temperature rise rate coefficient for the lubricating oil for the oil lubricated component.

19 Claims, 7 Drawing Sheets

(51) Int. Cl.
    *F16N 29/00*     (2006.01)
    *F16H 57/01*     (2012.01)
    *F16H 57/04*     (2010.01)
    *E21B 19/06*     (2006.01)

(52) U.S. Cl.
    CPC ............ *F16N 29/00* (2013.01); *G01M 13/02* (2013.01); *E21B 19/06* (2013.01); *F16H 2057/012* (2013.01); *F16N 2250/08* (2013.01)

(56) References Cited

U.S. PATENT DOCUMENTS

| | | | | |
|---|---|---|---|---|
| 6,845,745 | B2* | 1/2005 | Carey | F01M 9/02 123/196 R |
| 8,043,054 | B2* | 10/2011 | D | F03D 7/0292 290/44 |
| 2002/0105429 | A1* | 8/2002 | Donner | B61K 9/04 340/682 |
| 2003/0183188 | A1* | 10/2003 | Carey | F01M 9/02 123/195 P |
| 2010/0138267 | A1* | 6/2010 | Vittal | G05B 23/0283 702/184 |
| 2011/0142621 | A1 | 6/2011 | D et al. | |
| 2011/0144851 | A1 | 6/2011 | Gremminger et al. | |
| 2012/0025529 | A1 | 2/2012 | Davis et al. | |
| 2015/0160101 | A1 | 6/2015 | Gao et al. | |
| 2015/0323395 | A1* | 11/2015 | Kawakami | F16H 59/72 702/130 |
| 2017/0363601 | A1* | 12/2017 | Worden | F16N 29/00 |
| 2018/0095133 | A1* | 4/2018 | Kealy | G07C 3/00 |
| 2018/0340924 | A1* | 11/2018 | Zhang | F01M 11/10 |

\* cited by examiner

CONDITION MONITORING METHOD

CROSS REFERENCE TO PRIOR APPLICATIONS

This application is a U.S. National Phase application under 35 U.S.C. § 371 of International Application No. PCT/NO2016/050142, filed on Jun. 27, 2016 and which claims benefit to Norwegian Patent Application No. 20150899, filed on Jul. 9, 2015. The International Application was published in English on Jan. 12, 2017 as WO 2017/007333 A1 under PCT Article 21(2).

FIELD

The present invention relates to a method and system for condition monitoring of mechanical equipment, and more particularly to a method and system for early identification of a deteriorating condition in the equipment.

BACKGROUND

Condition monitoring of mechanical equipment can be performed in a number of different ways, both with physical inspection and condition estimation based on measured parameters. Such condition monitoring is essential for many applications in order to identify a deteriorating condition before it leads to an actual fault or breakdown of the system. One such example is offshore drilling rigs where operational reliability is critical and faults can have significant consequences, both environmental and in terms of personnel safety. This in particular applies to equipment which is operated under harsh conditions (e.g., exposed to weather or in contact with substances such as drilling mud) and/or subject to irregular loads or repeated load variations.

The most common maintenance strategy is presently calendar based; i.e., equipment must undergo a full maintenance cycle at predefined times. This is costly, especially if the equipment cannot be inspected/serviced on site. Most of the cost is related to non-productive time caused by the mandatory service. Apart from the potential cost saving from performing maintenance only when needed, or from planning for maintenance at times that are convenient according to the rig's work plans, great savings can also result from condition monitoring and predictions based on the trend of condition indicators if early signs of deterioration can be used to prevent breakdown. A need to further improve known systems and techniques therefor therefore exists.

SUMMARY

An aspect of the present invention is to improve the accuracy and reliability of previously-described condition monitoring systems and methods, and to reduce or eliminate at least some disadvantages associated with conventional systems.

In an embodiment, the present invention provides a method for monitoring a condition of a mechanical system which comprise a first oil lubricated component. The mechanical system is subject to repeated, intermittent load cycles. The method includes: (a) identifying a start of a load cycle, (b) measuring a load of the first oil lubricated component, (c) measuring a temperature of a lubricating oil for the first oil lubricated component, (d) calculating a first system performance parameter value for the load cycle, (e) repeating steps (a) to (d) for a plurality of load cycles, and (f) comparing a plurality of first system performance parameter values calculated to identify a change in the first system performance parameter values over the plurality of load cycles. The first system performance parameter value for the load cycle is selected from a friction coefficient for the first oil lubricated component, a temperature increase coefficient for the lubricating oil for the first oil lubricated component, and a temperature rise rate coefficient for the lubricating oil for the first oil lubricated component.

BRIEF DESCRIPTION OF THE DRAWINGS

The present invention is described in greater detail below on the basis of embodiments and of the drawings in which.

DETAILED DESCRIPTION

Figure 1:
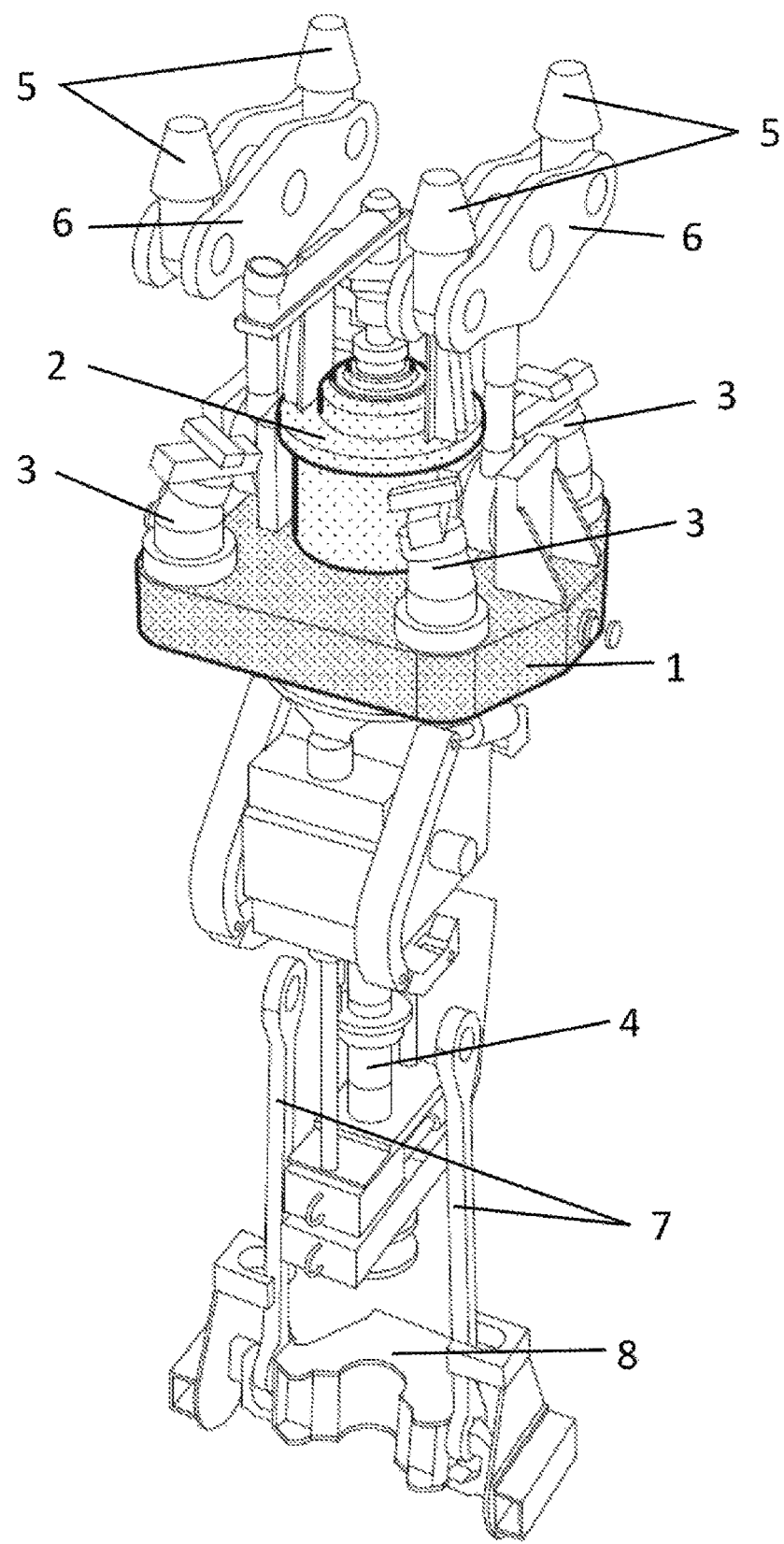
FIG. 1 shows an illustration of a top drive for a drilling rig.

In an embodiment, the present invention provides a method for monitoring the condition of a mechanical system having a first oil lubricated component, the mechanical system being subject to repeated, intermittent load cycles, comprising the steps of:

(a) identifying the start of a load cycle;
(b) measuring a load of the first oil lubricated component;
(c) measuring a temperature of a lubricating oil for the first oil lubricated component;
(d) determining a first system performance parameter for the load cycle, selected from a group of (i) a friction coefficient for the first oil lubricated component, (ii) a temperature increase coefficient for the lubricating oil for the first oil lubricated component, (iii) a temperature rise rate coefficient for the lubricating oil for the first oil lubricated component;
(e) repeating steps (a) to (d) for a plurality of load cycles; and
(f) comparing a plurality of determined first system performance parameter values to identify a change in the first system performance parameter over the plurality of load cycles.

By determining performance parameters for individual load cycles and comparing the determined values over a plurality of cycles, one can advantageously identify a deteriorating trend in the mechanical or lubricating performance of the system.

The first oil lubricated component can, for example, be a gear or a swivel.

The step of measuring a load of the first oil lubricated component can, for example, include measuring a power transferred through the gear.

The step of measuring a load of the first oil lubricated component can, for example, include measuring a hook load acting on the swivel.

In an embodiment, the mechanical system further comprises a second oil lubricated component, the method further comprising the steps of:

(b2) measuring a load of the second oil lubricated component;

(c2) measuring a temperature of a lubricating oil for the second oil lubricated component;

(d2) determining a second system performance parameter for the load cycle, selected from a group of (i) a friction coefficient for the second oil lubricated component, (ii) a temperature increase coefficient for the lubricating oil for the second oil lubricated component, (iii) a temperature rise rate coefficient for the lubricating oil for the second oil lubricated component;

(e) repeating steps (b2) to (d2) for a plurality of load cycles; and (f) comparing a plurality of determined second system performance parameter values for the plurality of load cycles.

The first oil lubricated component can, for example, be a gear and the second oil lubricated component can, for example, be a swivel.

The step of measuring a load of the first oil lubricated component can, for example, include measuring a power transferred through the gear, and the step of measuring a load of the second oil lubricated component can, for example, include measuring a hook load acting on the swivel.

The step of comparing a set of determined performance parameter values for the plurality of load cycles can, for example, include comparing a plurality of first system performance parameter values with a plurality of second system performance values.

The friction coefficient can, for example, be a function of a friction work in the first or second oil lubricated component and the load of the first or second oil lubricated component, the temperature increase coefficient can, for example, be a function of a temperature increase in the first or second oil lubricated component and the load of the first or second oil lubricated component, and the temperature rise rate coefficient can, for example, be a function of a rate of temperature increase in the first or second oil lubricated component and the load of the first or second oil lubricated component.

The plurality of load cycles can, for example, be the first 2-5 cycles following a start of the mechanical system from a cold condition.

The mechanical system can, for example, be a top drive for a drilling rig.

In an embodiment, the present invention provides for a method for monitoring the condition of a mechanical system having a first oil lubricated component and a second oil lubricated component, the mechanical system being subject to repeated, intermittent load cycles, comprising the steps of:

(a) identifying the start of a load cycle;

(b) measuring a temperature of a lubricating oil for the first oil lubricated component;

(c) measuring a temperature of a lubricating oil for the second oil lubricated component;

(d) determining a first system performance parameter for the load cycle, selected from a group of (i) a first friction coefficient for the first oil lubricated component, (ii) a first temperature increase coefficient for the lubricating oil for the first oil lubricated component, and (iii) a first temperature rise rate coefficient for the lubricating oil for the first oil lubricated component;

(e) determining a second system performance parameter for the load cycle, selected from a group of (i) a second friction coefficient for the second oil lubricated component, (ii) a second temperature increase coefficient for the lubricating oil for the second oil lubricated component, and (iii) a second temperature rise rate coefficient for the lubricating oil for the second oil lubricated component;

(f) repeating steps (a) to (e) for a plurality of load cycles; and (g) comparing a plurality of determined first system performance parameter values and second system performance parameter values to identify a change in the first system performance parameter or the second system performance parameter over the plurality of load cycles.

The first oil lubricated component can, for example, be a gear.

The step of measuring a load of the first oil lubricated component can, for example, include measuring a power transferred through the gear.

The first oil lubricated component is alternatively a swivel.

The step of measuring a load of the first oil lubricated component can, for example, include measuring a hook load acting on the swivel.

Alternatively, the first oil lubricated component is a gear and the second oil lubricated component is a swivel.

The step of measuring a load of the first oil lubricated component can, for example, include measuring a power transferred through the gear and the step of measuring a load of the second oil lubricated component can, for example, include measuring a hook load acting on the swivel.

The step of comparing a plurality of determined first system performance parameter values and second system performance parameter values can, for example, include comparing a plurality of first system performance parameter values with a plurality of second system performance values.

The method can, for example, further comprise the step of determining a third system performance parameter, the third system performance parameter being a function of the first system performance parameter and the second system performance parameter.

The third system performance parameter can, for example, be a ratio of the first system performance parameter to the second system performance parameter.

The third system performance parameter is alternatively a difference between the first system performance parameter and the second system performance parameter.

The plurality of load cycles can, for example, be the first 2-5 cycles following a start of the mechanical system from a cold condition.

The mechanical system can, for example, be a top drive for a drilling rig.

Embodiments of the present invention will now be described in relation to a system used for earth drilling, however, the present invention is suitable for use with a wide range of equipment and is not restricted to the specific examples here described.

FIG. 1 shows an illustration of a top drive for a drilling rig, having a gear box 1 and a swivel 2, both being oil lubricated. In a first embodiment of the present invention, there is provided a method of using live and/or recorded data from a drilling machine to estimate the condition of the gear box 1 and swivel 2.

A typical drilling machine or top drive may be composed of one on more motors 3, electrical or hydraulic, with an associated gear box 1 for adapting the rotational speed and torque of the motors 3 to the requirements for rotating the drill string with a suitable rotational speed and torque. The top drive is provided with connection points 5 on lifting yokes 6 for connection to hoisting wires in a hoisting or lifting system on the drilling rig. In its lower end, the top drive is provided with elevator links 7 and an elevator 8 for engaging the top end of a drill string. In use, the top drive provides rotational torque to the drill string by the motors 3 and controls its vertical position in relation to the wellbore through the hoisting system.

The speed and torque of the drill string may be monitored by physical sensors coupled to a drilling control system, and are recorded for monitoring purposes. The speed and torque of the electric or hydraulic motor(s) 3 can alternatively be measured. The gear box 1 is lubricated by an oil bath, and the temperature of the oil bath is measured by physical sensors coupled to a drilling control system, and is recorded for monitoring purposes. A thrust bearing, also known as the swivel 2, separates the axial load from the motor(s) 3 and gear box 1. The swivel 2 is lubricated by an oil bath, and the temperature of the oil bath is measured by physical sensors coupled to a drilling control system, and is recorded for monitoring purposes. The oil bath for the swivel 2 can be separate from the oil bath of the gear box, or it may be the same oil bath. As a vital part of the drilling process, a drilling fluid, often colloquially referred to as "mud", is circulated downward to the drill bit through the drill string and returned to the surface, normally through the annular space between the drill string and the well casing. This drilling fluid is normally also circulated through the main shaft 4 of the top drive, thus passing through both the gear box 1 and the swivel 2.

Figure 2:
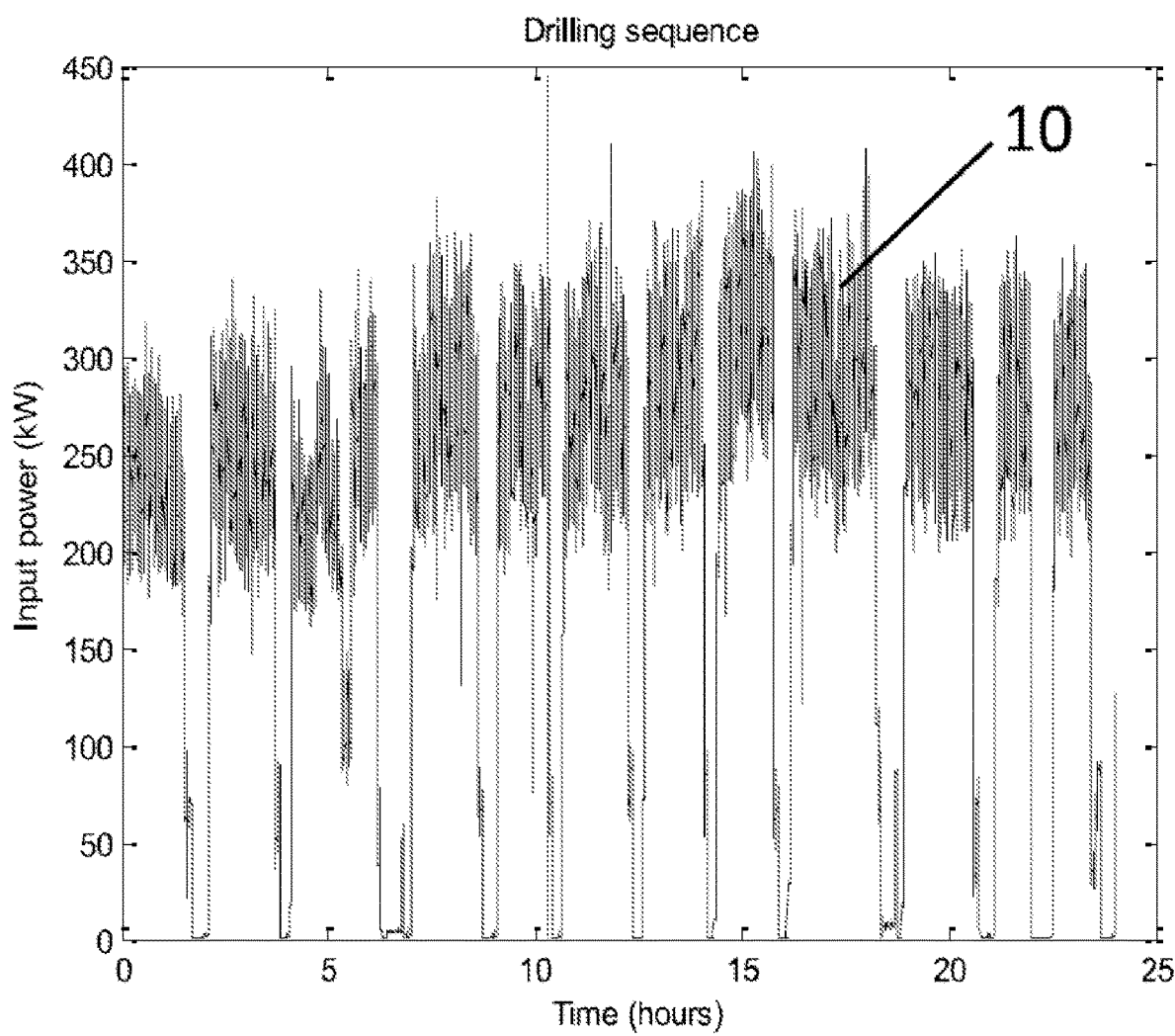
FIG. 2 shows a typical plot of input power to a top drive during a drilling sequence.

A drilling sequence on an offshore drilling rig includes drilling one stand (approximately 30 m) followed by a connection period with no drilling. During the drilling phase (also known as a drilling sequence or drilling event), the temperatures of both the gear box and the swivel will rise considerably, and these temperatures will drop during the period with no drilling (the connection phase or event). The temperature rise is due to the friction loss in the gear box and swivel, respectively. FIG. 2 shows a typical plot of input power 10 to the top drive during a drilling sequence. The drilling sequences can be seen; these may take in the order of 100 minutes, while the connection phase may take 30 minutes. These values may, however, vary significantly according to the relevant operating conditions.

Figure 3:
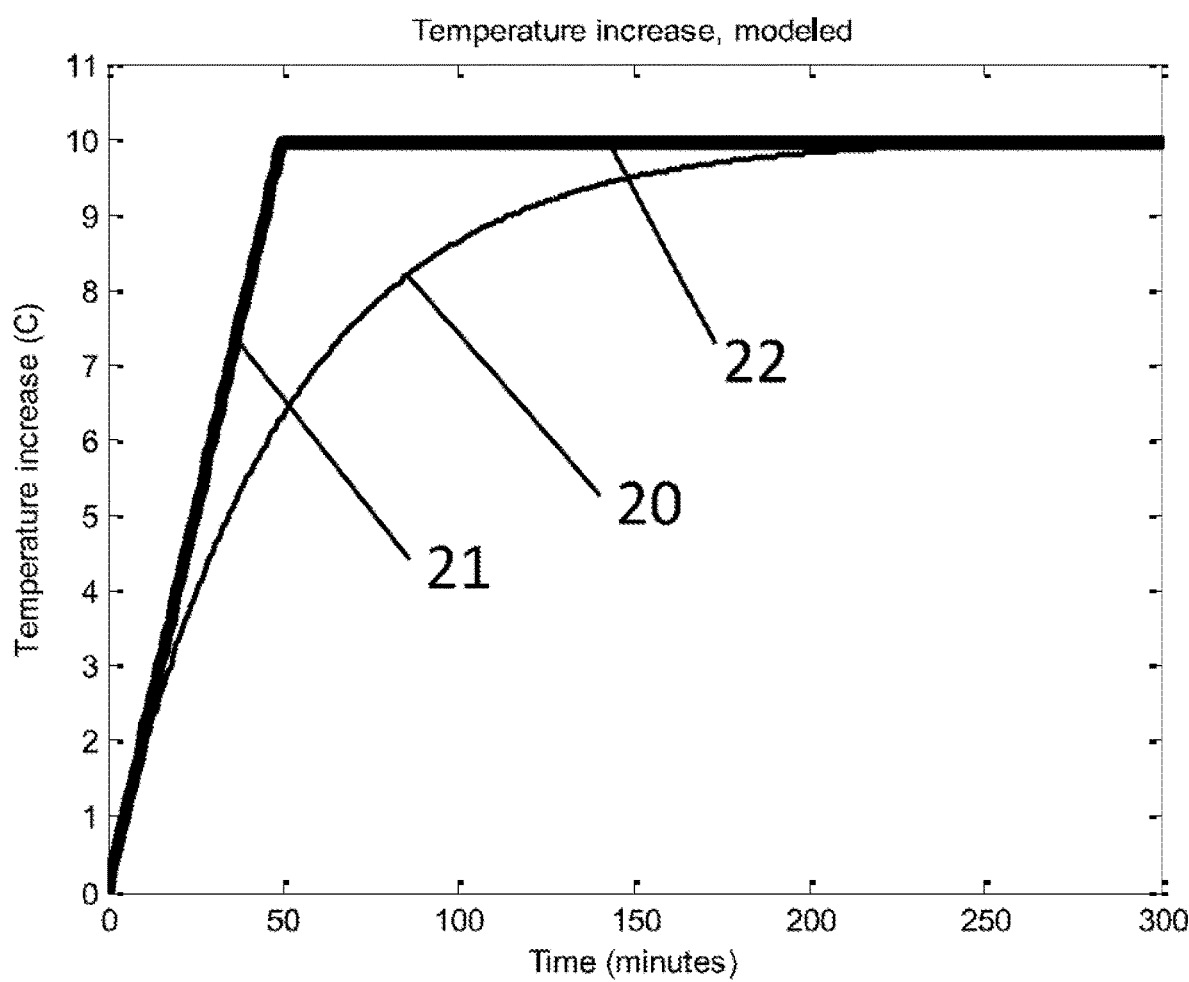
FIG. 3 shows the temperature increase in an oil bath following the start of a drilling load cycle.

Upon start of a drilling sequence, the lubrication oil temperature in the oil bath for the gear box and the swivel will increase, and this increase will typically follow a first-order type response. FIG. 3 illustrates this, showing the oil bath temperature development graph 20 against time. FIG. 3 also shows the initial rise rate 21 for the first-order graph 20 and the final (steady state) response 22. Both these parameters are well-known for first-order functions and straight-forward to calculate.

This type of heating model is uniquely defined by only two parameters: the initial heating rate before heat loss to the ambient is significant (the graph 21) and the steady state limit (the top asymptote, graph 22) where the heat loss is equal to the friction power input. With a constant heating over a drilling event, starting at temperature $T_0$, the temperature $T(t)$ will increase slower as the heat loss increases. With an approximately linear dependency between temperature difference and heat loss, the solution of the inherent differential equation fits well with a simple exponential function in time:

$$T(t) = T_0 + (T_\infty - T_0)(1 - \exp(-(t/t_c)))$$

When a steady state is reached, there is no net heat increase, $P_h = P_f - P_l = 0$ when T approaches $T_\infty$. The final temperature limit $T_\infty$ will be given by $T_\infty - T_0 = P_1/L$.

The above subscripts h, f and l refer to heating, friction and heat loss to the ambient. $P_h$ therefore means net power that goes into heating the component, $P_f$ is the power dissipated in the component because of friction, and $P_l$ is the power lost to the ambient because of temperature difference between the component and the ambient.

Figure 4:
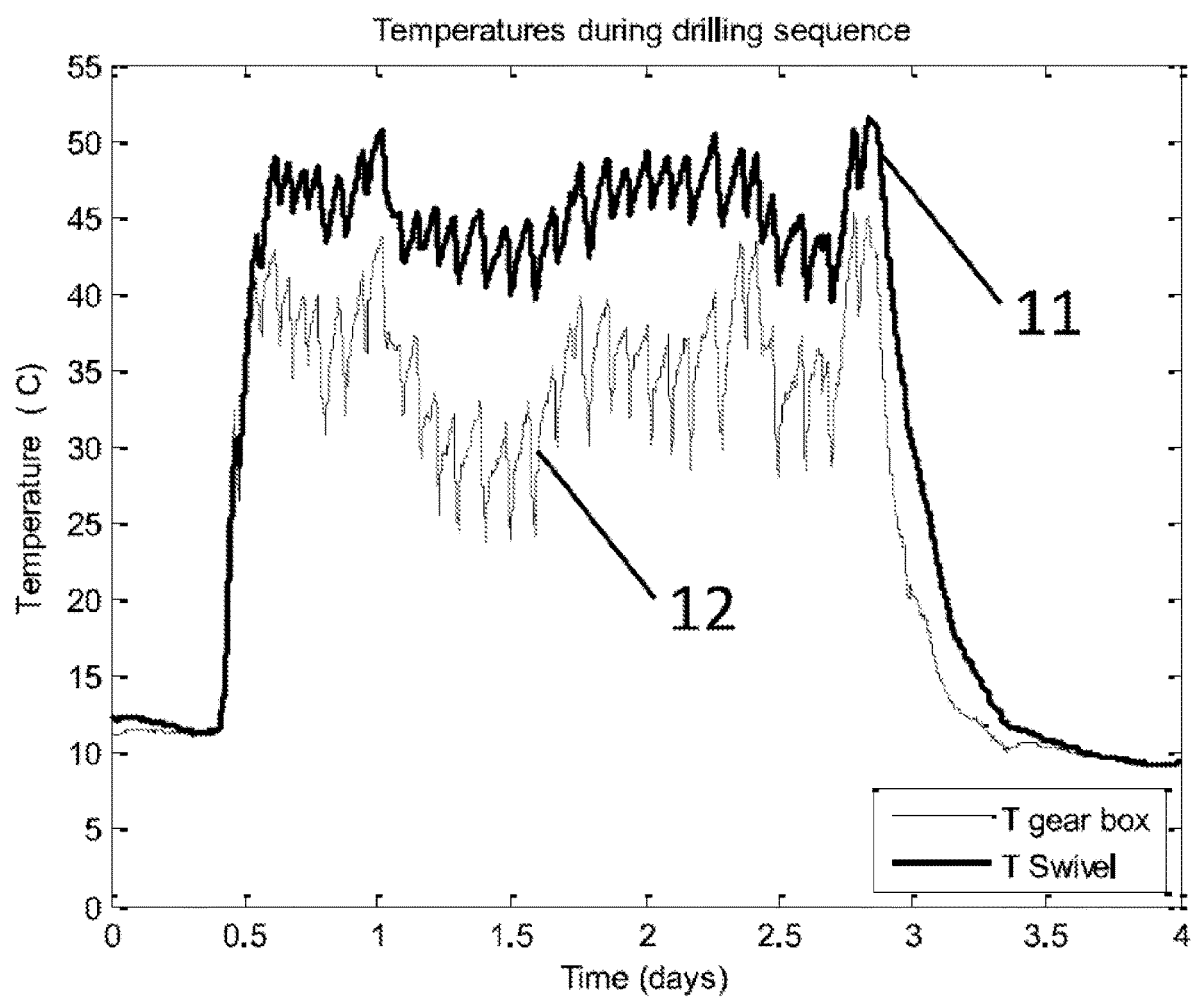
FIG. 4 shows the temperature of the gear box and swivel oil baths through a series of drilling sequences.

FIG. 4 shows temperature plots 11, 12 of the swivel and gear box oil baths, respectively, through a series of drilling sequences interrupted by pauses, followed by a long cooling event. The total time shown is approximately 89 hours (=3.71 days) with 4 hours/grid. The cyclic behavior of the temperatures during operation can be seen.

Figure 5:
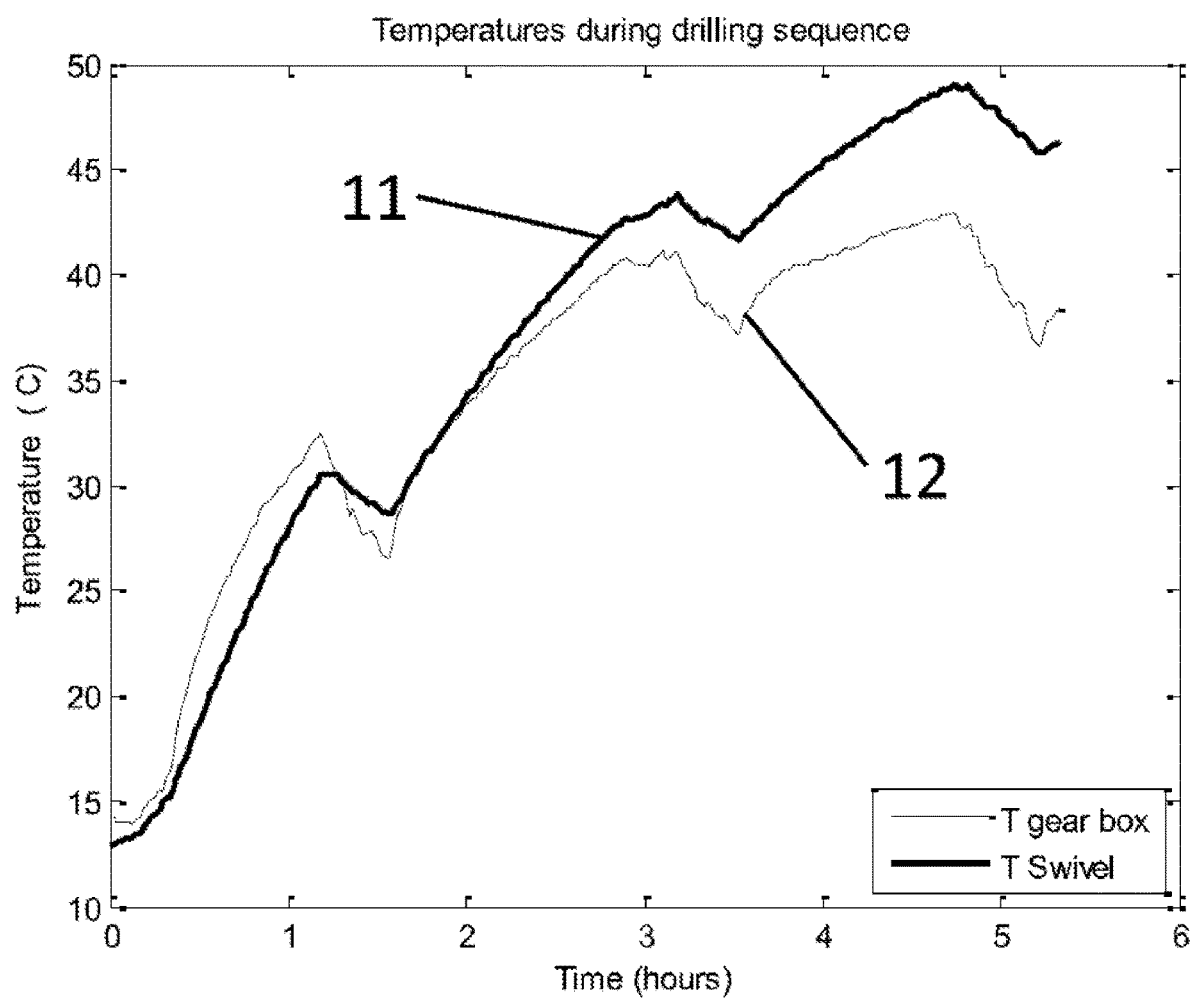
FIG. 5 shows an extract of the data shown in FIG. 4 in greater detail.

FIG. 5 shows an extract of the data shown in FIG. 4, i.e., the temperature of the gear box and swivel oil baths, at the start of drilling and over 5.63 hours (30 min/grid). There is a rapid temperature increase in both oil temperatures as the drilling starts. The plot in FIG. 5 shows 3 drilling events each followed by a cooling event when connecting new stands of drill pipe.

A deteriorating condition or damage in the swivel or gear box can be identified at an early stage by providing temperature sensors for logging the swivel and gear box oil bath temperatures, and analyzing the response in these parameters to a change in the load. One method of achieving this identification according to the present invention will now be described. In this embodiment of the present invention, a method is provided comprising steps (a) to (f). The method will be described employed on both the swivel and the gear box oil bath, however, it is to be understood that the method may be employed individually on either of these components, or on both.

During operation of a top drive system, a first step (a) comprises identifying the start of a load cycle, i.e., a drilling sequence. This can be done, for example, by measuring the power input to a motor (e.g., an electric or hydraulic motor) driving the top drive unit (see FIG. 2), by measuring the torque applied by the motor, or by measuring the speed of the top drive. Several of these variables may be directly available from a drilling control system.

In a second step (b), a load of the swivel and/or gear box is measured. The load for the gear box may be the power transferred through the gear box (which can either be measured directly, measured from the motor power, or calculated based on, for example, top drive rotational speed (rpm) and torque). For the swivel, which does not transfer any load per se, the load may be a "virtual load". A particularly useful parameter for estimating swivel load is as a function of rotational speed (rpm) and hook load, i.e., the weight carried by the top drive and the swivel. This may be a length of drill string extending downhole below the drilling rig.

Thus, in this example, the relevant load for the gear box is the rotational power equal to torque (in Newton-meter) times rotational speed (in radians per second), equals Watt. For the swivel, taking up the vertical load on the drilling machine, the relevant power is the vertical load in Newton times the mean radius of the roller bearing times the rotational speed. The heating power equals the specific heat capacity of the oil and steel, multiplied by the mass of oil and steel, respectively.

In a third step (c), the temperature of the lubricating oil in the swivel and gear box oil baths are measured continuously or periodically during the load cycle.

In a fourth step (d), a system performance parameter for the load cycle is calculated based on the measured load and temperature values. This system performance parameter may be: (i) a friction coefficient, (ii) a temperature increase coefficient, or (iii) a temperature rise rate coefficient for the lubricating oil for the first oil lubricated component.

A friction coefficient may be defined as the ratio of the instantaneous friction heating power divided by the relevant load of the same component (gear box or swivel). By monitoring the heating sequences, the relevant power inputs and, optionally, the ambient temperature plus the mud temperature and mud flow, this thermal model can be used to calculate an instantaneous (or, for example, averaged over a drilling event of approximately one hour) friction coefficient for each relevant component (gear box and swivel) for every drilling event.

The friction heating power added to the lubricating oil may be calculated or estimated based on the measured temperature increase of the oil, thereby taking into account the heat capacity of the oil and/or relevant mechanical components which will be heated by the oil if necessary. Heat loss to the ambient can also be taken into account if appropriate, for example, by estimating heat loss as proportional to the instantaneous temperature difference between the oil and ambient temperature.

The friction coefficient is thus indicative for the work lost to friction in the component, which will increase in the case of a deteriorating condition of that component.

A temperature increase coefficient can be found by measuring the temperature increase of the oil in response to the start of a drilling event. This may be in the form of a steady-state value of the lubrication oil temperature, if this temperature reaches a substantially steady value during the drilling event, or, alternatively, the temperature increase coefficient may be equal to the temperature increase itself.

Figure 6:
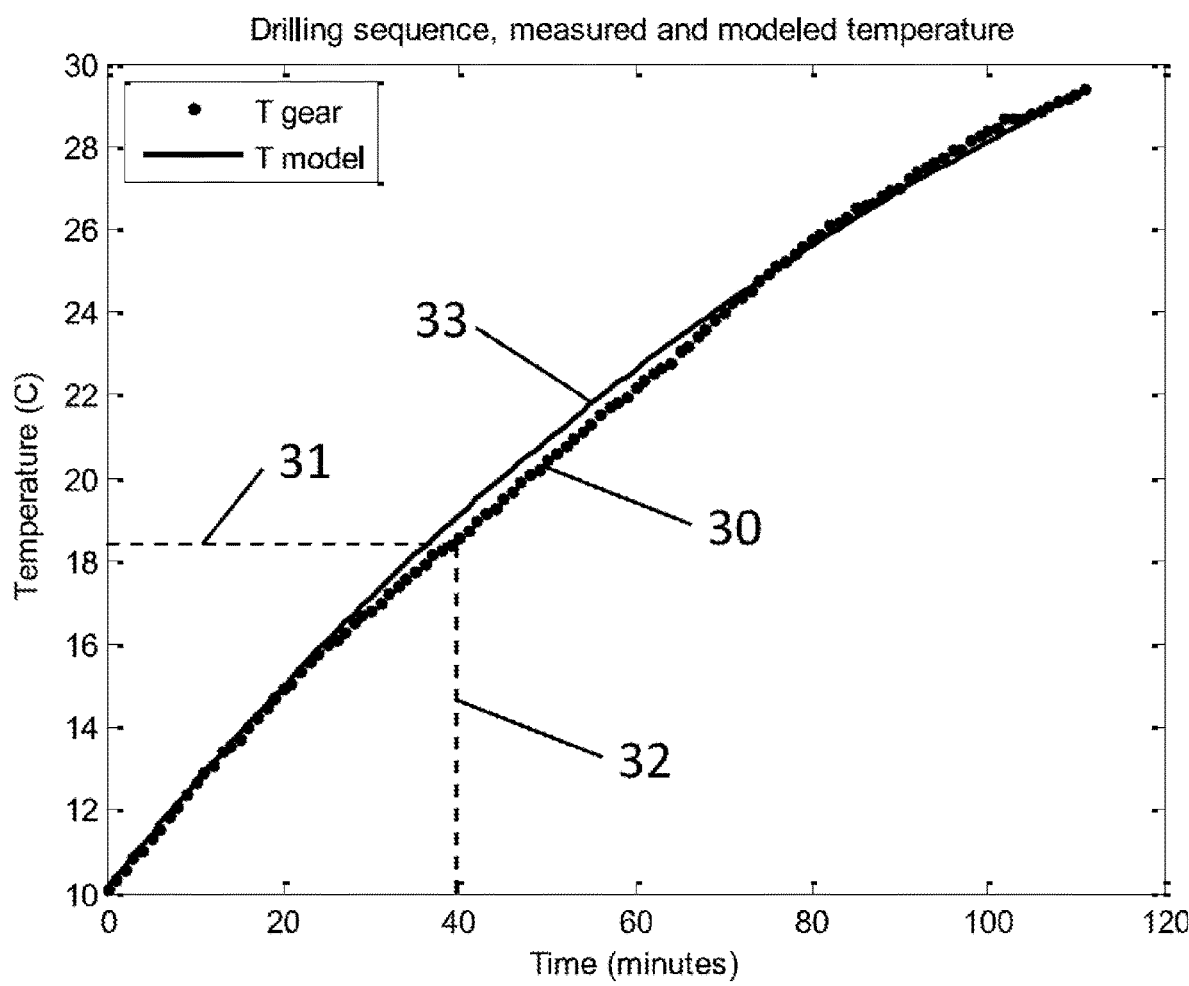
FIG. 6 shows a set of measured gear lubrication oil temperatures and a fitted first-order model.

The temperature increase coefficient may alternatively be based on a temperature increase at a specific time, pre-determined following the start of a drilling event. This is shown in FIG. 6 where the temperature of a set of measured gear lubrication oil temperatures 30 is read off at a time 40 minutes after the start of an event, as indicated by dashed lines 31 and 32.

Figure 7:
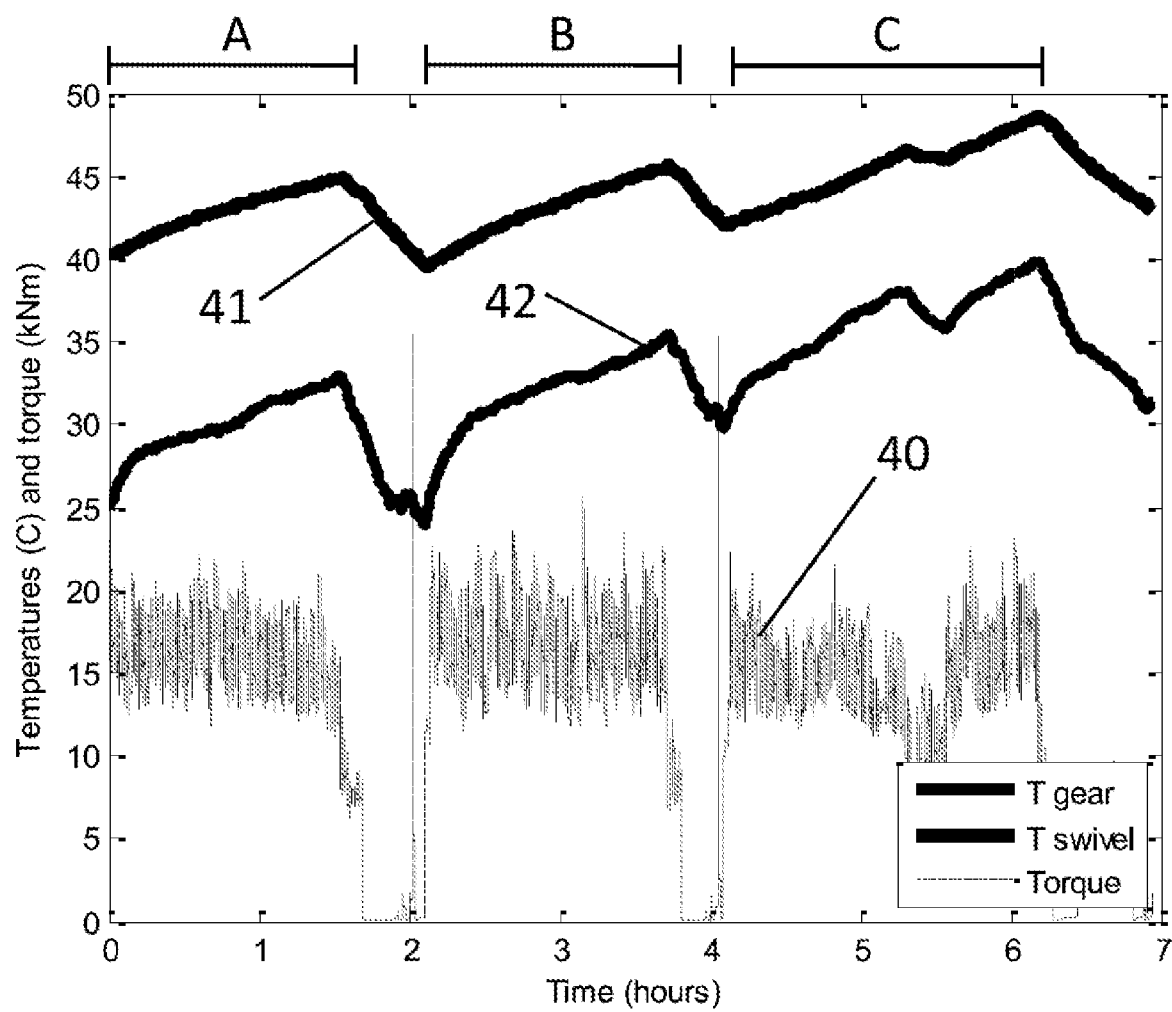
FIG. 7 shows a measured torque, a measured swivel oil temperature, and a gear oil temperature for three drilling events.

Yet another alternative may be to define the temperature increase coefficient as a function of the temperature increase and the load, for example, the temperature increase divided by average load over that drilling event or measurement interval. Referring to FIG. 7, this may, as an example, be taken as the temperature increase divided by the average torque during the first 1 h of operation of a drilling event; for the first cycle in FIG. 7 this would give a temperature increase coefficient for gear oil temperature 42 of approximately 5° C./16 kNm=0.31° C./kNm.

The temperature increase coefficient is therefore indicative of the level of temperature increase in the lubricating oil for a component, in response to operation of the mechanical system.

A temperature rise rate coefficient can be found by approximating the temperature response in each load cycle to a first-order graph (see FIG. 3) and calculating the initial rise rate 21. FIG. 6 illustrates a fitted first-order model 33 to the measured gear lubrication oil temperatures 30. Having a fitted model, one can calculate the time constant, initial rise rate, and/or the final value of the modeled temperature response. Either of these, or a combination, may form the temperature rise rate coefficient on their own, or in combination with the measured load for the relevant drilling event.

A simplified temperature rise rate coefficient can alternatively be calculated, for example, by taking the temperature increase from the start of the load cycle to a pre-determined time thereafter, for example, 40 minutes, and calculating the temperature rise rate in that interval. For example, the data point indicated by dashed lines 31, 32 in FIG. 6 would give a temperature rise rate in this interval of approximately 18.5° C./40 min.=0.5° C./min The temperature rise rate coefficient is therefore indicative of the rate of temperature increase in the lubricating oil for a component in response to operation of the mechanical system.

For systems or modes of operation where the load varies between cycles, the load can, for example, be taken into account when defining the temperature increase coefficient and the temperature rise rate coefficient. This may not be necessary, however, where the load is substantially constant over a plurality of cycles.

The method further comprises repeating steps (a) to (d) for a plurality of load cycles. FIG. 7 shows three drilling events: A, B and C, and a measured torque 40, a measured swivel oil temperature 41 and a gear oil temperature 42. One implementation of the method according to the present invention may in this case be to:
  identify the start of a load cycle (A, B and C) by identifying the increase in the measured torque 40;
  defining the load for the gear as the applied torque and measuring this to produce a measured torque signal 40;
  measuring the temperature of the gear oil to produce a measured temperature signal 42;
  defining the performance parameter for the gear as a temperature increase coefficient equal to the temperature increase 60 minutes after start of a drilling event divided by the average measured torque 40 over the same period (for cycle A, this is equivalent to approximately 5° C. temperature increase divided by approximately 17 kNm average torque);
  repeating the above steps for cycles A, B and C (and, optionally, further cycles); and
  comparing the values for individual cycles over time to identify a deteriorating trend.

For example, more than 10 load cycles, or, for example, more than 30 load cycles, or, for example, more than 50 load cycles are used in order to improve the accuracy of the predictions.

Over time, the performance parameter (friction coefficient, temperature increase coefficient or temperature rise rate coefficient) can thus be trended, and a reliable mean or median computed, with a more or less stable standard variation (sigma). If the component (gear box or swivel), for example, has suffered abnormal wear, the friction work from the component will increase, which will generally lead to increased heat dissipation into the lubricating oil. The performance parameter will thus tend to increase gradually. When a stable upward trend is detected, exceeding the 4, 5 or 6 sigma levels, notifications to the maintenance responsible can be given, noting an early warning of a deteriorating condition.

In an embodiment of the present invention, there is provided a method comprising the steps:
  (a) identifying the start of a load cycle;

(b) measuring a temperature of a lubricating oil for the first oil lubricated component, such as a swivel;

(c) measuring a temperature of a lubricating oil for the second oil lubricated component, such as a gear;

(d) determining a first system performance parameter for the load cycle, selected from a group of (i) a first friction coefficient for the first oil lubricated component, (ii) a first temperature increase coefficient for the lubricating oil for the first oil lubricated component, and (iii) a first temperature rise rate coefficient for the lubricating oil for the first oil lubricated component;

(e) determining a second system performance parameter for the load cycle, selected from a group of (i) a second friction coefficient for the second oil lubricated component, (ii) a second temperature increase coefficient for the lubricating oil for the second oil lubricated component, and (iii) a second temperature rise rate coefficient for the lubricating oil for the second oil lubricated component;

(f) repeating steps (a) to (e) for a plurality of load cycles; and (g) comparing a plurality of determined first system performance parameter values and second system performance parameter values to identify a change in said first system performance parameter or said second system performance parameter over the plurality of load cycles.

The first and second system performance parameters are compared advantageously with each other. This has the benefit that a deteriorating trend can be identified in one system performance parameter relative to the other. For example, one would not normally expect both components to fail at the same time. By comparing a system performance parameter of one component to a system performance parameter of the other component, one can thus identify a deteriorating trend without the need to take external variables into account.

In an embodiment of the present invention, a third performance parameter can, for example, be defined, the third performance parameter being a function of the first and second performance parameters. In an embodiment, the third performance parameter can, for example, be a ratio of the first and second performance parameters. In an embodiment, the third performance parameter can, for example, be a difference between the first and second performance parameters.

This provides the advantage that a deteriorating condition can be identified based on the development in the third performance parameter. One would expect, for example, the first and second performance parameters to be somewhat influenced by external conditions, such as ambient temperature, mud temperature, etc. A third performance parameter, being, for example, a ratio between the first and second performance parameters will be significantly less sensitive to such external factors.

Improved accuracy can thus be achieved, for example, by treating the difference between or ratio of the two measured oil bath temperature increase coefficients as a new variable. The temperatures of the two oil baths will normally follow similar development curves, not equal but related. Both of them are unlikely to fail or change behavior significantly at the same time, but both will be somewhat influenced by, for example, ambient temperature. However, if one suddenly changes behavior and gets significantly warmer relative to the other, it may be suspected to fail in the near future. The third performance parameter may thus identify such a condition, while eliminating noise from other factors.

An advantage of comparing two performance parameters with each other, either directly or by defining a third performance parameter, is that two components of a mechanical system can be used for condition monitoring or state estimation even if these components have substantially different operating characteristics or functions. For example, in a top drive, the swivel only carries the load via a rolling motion whereas the gear transfers the rotating power through a gear system. Their friction coefficients will thus be substantially different, however, they can be expected to respond similarly to changing operating conditions of the mechanical system.

An advantage of the method according to the present invention is that the operational characteristics of a system which is subject to regular and intermittent loads can be utilized to improve accuracy of the measurements and predictions. This is because there will always be measurement noise and random or cyclical variations, but by carrying out measurements over a large number of cycles, one can reliably identify trends which would otherwise not be possible to measure on individual or a small number of cycles. For example, from the oil bath temperature increases and the power usage, a friction coefficient (e.g. friction heating power divided by input power) can thus be calculated and trended over time. Deviation from the long time average above a certain number of standard deviations will be the basis for early notification.

The present invention is not limited to embodiments described herein; reference should be had to the appended claims.

What is claimed is:

1. A method for monitoring a condition of a mechanical system comprising a first oil lubricated component, the mechanical system being subject to repeated, intermittent load cycles, the method comprising:

(a) identifying a start of a load cycle;

(b) measuring a load of the first oil lubricated component;

(c) measuring a temperature of a lubricating oil for the first oil lubricated component;

(d) calculating a first system performance parameter value for the load cycle selected from,
  (i) a friction coefficient for the first oil lubricated component, wherein the friction coefficient for the first oil lubricated component is a function of a friction work in the first oil lubricated component, and the function of the friction work in the first oil lubricated component is a measurement of a wear of the first oil lubricated component as reflected by a heat dissipation of the first oil lubricated component into the lubricating oil,
  (ii) a temperature increase coefficient for the lubricating oil for the first oil lubricated component, and
  (iii) a temperature rise rate coefficient for the lubricating oil for the first oil lubricated component;

(e) repeating steps (a) to (d) for a plurality of load cycles;

(f) comparing a plurality of first system performance parameter values calculated to identify a change in the first system performance parameter over the plurality of load cycles; and (g) using the change in the first system performance parameter over the plurality of load cycles identified to monitor the condition of the mechanical system.

2. The method as recited in claim 1, wherein the first oil lubricated component is a gear.

3. The method as recited in claim 2, wherein the measuring of the load of the first oil lubricated component comprises measuring a power transferred through the gear.

4. The method as recited in claim 1, wherein the first oil lubricated component is a swivel.

5. The method as recited in claim 4, wherein the measuring of the load of the first oil lubricated component comprises measuring a hook load acting on the swivel.

6. The method as recited in claim 1, wherein the mechanical system further comprises a second oil lubricated component, and the method further comprises:
   (b2) measuring a load of the second oil lubricated component;
   (c2) measuring a temperature of a lubricating oil of the second oil lubricated component;
   (d2) calculating a second system performance parameter value for the load cycle selected from,
      (i) a friction coefficient for the second oil lubricated component, wherein the friction coefficient for the second oil lubricated component is a function of a friction work in the second oil lubricated component, and the function of the friction work in the second oil lubricated component is a measurement of a wear of the second oil lubricated component as reflected by a heat dissipation of the second oil lubricated component into the lubricating oil,
      (ii) a temperature increase coefficient for the lubricating oil for the second oil lubricated component, and
      (iii) a temperature rise rate coefficient for the lubricating oil for the second oil lubricated component;
   (e) repeating steps (b2) to (d2) for the plurality of load cycles;
   (f) comparing a plurality of second system performance parameter values calculated over the plurality of load cycles to identify a change in the second system performance parameter over the plurality of load cycles; and
   (g) using the change in the second system performance parameter over the plurality of load cycles identified to monitor the condition of the mechanical system.

7. The method of as recited in claim 6, wherein the temperature increase coefficient is a function of a temperature increase in the first oil lubricated component and the load of the first oil lubricated component or a function of a temperature increase in the second oil lubricated component and the load of the second oil lubricated component.

8. The method as recited in claim 6, wherein the temperature rise rate coefficient is a function of a rate of temperature increase in the first oil lubricated component and the load of the first oil lubricated component or a function of a rate of temperature increase in the second oil lubricated component and the load of the second oil lubricated component.

9. The method as recited in claim 6, wherein the plurality of load cycles are a first 2-5 cycles following a start of the mechanical system from a cold condition.

10. The method as recited in claim 6, wherein the first oil lubricated component is a gear and the second oil lubricated component is a swivel.

11. The method as recited in claim 10, wherein,
   the measuring the load of the first oil lubricated component comprises measuring a power transferred through the gear, and
   the measuring the load of the second oil lubricated component comprises measuring a hook load acting on the swivel.

12. A method for monitoring a condition of a mechanical system comprising a first oil lubricated component and a second oil lubricated component, the mechanical system being subject to repeated, intermittent load cycles, the method comprising:
   (a) identifying a start of a load cycle;
   (b1) measuring a load of the first oil lubricated component;
   (b2) measuring a load of the second oil lubricated component;
   (c1) measuring a temperature of a lubricating oil of the first oil lubricated component;
   (c2) measuring a temperature of a lubricating oil of the second oil lubricated component;
   (d) calculating a first system performance parameter value for the load cycle selected from,
      (i) a first friction coefficient for the first oil lubricated component, wherein the first friction coefficient is a function of a friction work in the first oil lubricated component, and the function of the friction work in the first oil lubricated component is a measurement of a wear of the first oil lubricated component as reflected by a heat dissipation of the first oil lubricated component into the lubricating oil,
      (ii) a first temperature increase coefficient for the lubricating oil for the first oil lubricated component, and
      (iii) a first temperature rise rate coefficient for the lubricating oil for the first oil lubricated component;
   (e) calculating a second system performance parameter value for the load cycle selected from,
      (i) a second friction coefficient for the second oil lubricated component, wherein the second friction coefficient is a function of a friction work in the second oil lubricated component, and the function of the friction work in the second oil lubricated component is a measurement of a wear of the second oil lubricated component as reflected by a heat dissipation of the second oil lubricated component into the lubricating oil,
      (ii) a second temperature increase coefficient for the lubricating oil for the second oil lubricated component, and
      (iii) a second temperature rise rate coefficient for the lubricating oil for the second oil lubricated component;
   (f) repeating steps (a) to (e) for a plurality of load cycles;
   (g) comparing a plurality of first system performance parameter values calculated and second system performance parameter values calculated to identify a change in the first system performance parameter values or in the second system performance parameter values over the plurality of load cycles; and
   (h) using the change in the first system performance parameter values or in the second system performance parameter values over the plurality of load cycles identified to monitor the condition of the mechanical system.

13. The method as recited in claim 12, wherein,
   the first oil lubricated component is a gear,
   the second oil lubricated component is a swivel,
   the measuring of the load of the first oil lubricated component comprises measuring a power transferred through the gear, and
   the measuring the load of the second oil lubricated component comprises measuring a hook load acting on the swivel.

14. The method as recited in claim 12, further comprising:
   (h) determining a third system performance parameter, the third system performance parameter being a function of the first system performance parameter and the second system performance parameter.

15. The method as recited in claim 12, wherein the plurality of load cycles are a first 2-5 cycles following a start of the mechanical system from a cold condition.

16. The method as recited in claim 12, wherein the first oil lubricated component is a gear.

17. The method as recited in claim 16, wherein the measuring of the load of the first oil lubricated component comprises measuring a power transferred through the gear.

18. The method as recited in claim 12, wherein the first oil lubricated component is a swivel.

19. The method as recited in claim 18, whereby the measuring of the load of the first oil lubricated component comprises measuring a hook load acting on the swivel.

* * * * *